Patented Dec. 2, 1924.

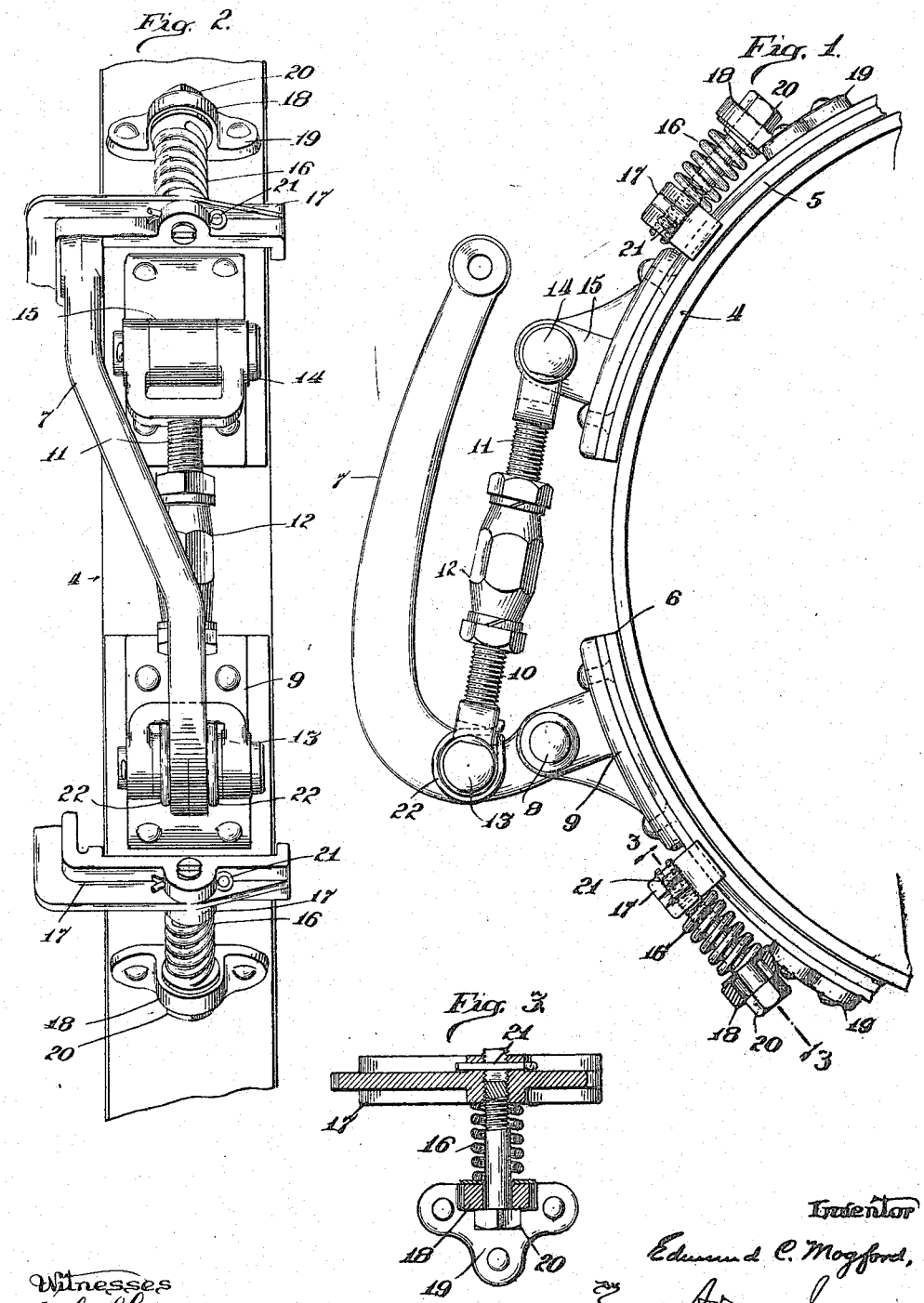

1,517,246

UNITED STATES PATENT OFFICE.

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN.

VEHICLE BRAKE.

Application filed December 26, 1919. Serial No. 347,324.

*To all whom it may concern:*

Be it known that I, EDMUND C. MOGFORD, a citizen of the United States, and a resident of Buchanan, in the county of Berrien and State of Michigan, have invented certain new and useful Improvements in Vehicle Brakes, of which the following is a specification, reference being had to the accompanying drawings.

My invention relates to brakes of the general type ordinarily used on motor vehicles, comprising a brake band supported at one side of a brake drum and extending thereover, the free ends of such brake band being connected with suitable lever mechanism by the operation of which the brake band is drawn closely into operative engagement with the surface of the drum. In brakes of this type it is necessary or desirable that means be provided for normally holding the brake band out of frictional engagement with the drum, and for restoring it to such inoperative position when the actuating lever is released, and my invention has to do with improved means for accomplishing this end. The object of my invention is to provide an improved construction by which undue wear of the parts will be avoided, by which they may be readily removed and replaced, and by which various other objections to the use of the devices heretofore employed for the purpose may be avoided, as will be more fully hereinafter explained. I accomplish this object as illustrated in the accompanying drawings and as hereinafter described. What I regard as new is set forth in the claims.

In the accompanying drawings,—

Fig. 1 is a fragmentary side elevation, partly in section, illustrating the brake drum with the cooperating brake band and operating mechanism therefor;

Fig. 2 is an end view of the parts shown in Fig. 1; and Fig. 3 is a detail, taken on section line 3—3 of Fig. 1.

Referring to the drawings,—4 indicates the brake drum which may be of any approved type, and 5, 6 indicate the usual brake band, only the free end portions of said band being shown. It will be understood that the opposite portion of said brake band, which may either be a unitary device or made up of separate parts, as may be preferred, is supported adjacent to the periphery of the drum 4 in any suitable manner. As these are details which have nothing to do with the improvements forming the subject-matter of this application it has not been thought necessary to illustrate or describe them in detail.

7 indicates the usual brake operating lever which is mounted upon a pivot 8 carried by a bracket 9 secured to a free end portion of the brake band, as 6, as shown in Fig. 1, and is intermediately connected with the other free end portion thereof, as 5, by means of bolts 10, 11 connected by a turn buckle 12 so that adjustment of the length of the connection is provided for. The bolt 10 is connected with the lever 7 by a pivot 13, and the bolt 11 is connected with the brake band portion 5 by a pivot 14 mounted in a bracket 15 secured thereto, as best shown in Fig. 1. This is all standard construction and separately considered it is not included in my present invention.

It will be apparent that by rocking the lever 7 in a counterclockwise direction as viewed in Fig. 1 the free ends 6, 7 will be drawn together and may be clamped tightly upon the brake drum, thereby braking the wheel with which the drum is connected. Ordinarily the brake drum is connected with the rear or propelling wheels of a motor vehicle, but so far as my present invention is concerned, it is not limited to the application of the brake drum to the rear wheels, as it may be applied to the front wheels or to the propeller shaft. It may also be used in any other situation to which it is adapted.

It is also evident that movement of the operating lever 7 in a clockwise direction as viewed in Fig. 1 will move the members 5, 6 apart, thereby releasing the brake, but it is desirable that means be provided for automatically returning the parts to their normal or inoperative position when the pull upon the brake lever is released, and it is necessary to provide for holding the brake band in such normal position so that it will not rattle or accidentally move into frictional engagement with the brake drum, and the devices by which this is accomplished constitute the improvements which form the subject-matter of this application.

As is best shown in the lower part of Fig. 1, I provide a compression spring 16 which is mounted between a fixed support or abutment independent of the brake band, and a movable support or stop carried by the brake band. The fixed support is preferably a bracket 17 which is secured in any suitable way to the frame of the vehicle, as to the rear axle housing, so that it is held rigidly in position to form an abutment against which one end of the spring 16 bears. Such abutment, in the construction shown, extends across the brake band, being positioned at a short distance therefrom, and is provided at its side margins with inwardly-turned flanges which lie opposite the edges of the band,—such construction of the abutment thus forming a retaining guide for the band that will counteract any tendency of the band to vibrate laterally. The movable support or stop is a lug 18 carried by a bracket 19 riveted or otherwise suitably secured to the brake band a sufficient distance from the position of the bracket 17 so that the spring 16 fits between and bears against said bracket and lug. It is desirable that the spring 16 be normally under some tension, and it will be apparent that when the brake band is moved endwise into operative engagement with the drum the lug 18 will be carried toward the bracket 17, thereby compressing the spring 16 and placing it under greater tension. As soon as the pull upon the brake lever 7 is released the spring will return the parts to their normal position shown in Fig. 1. For the purpose of holding the spring 16 in place and adjusting the normal position of the lug 18 with reference to the bracket 17 a bolt 20 is fitted in the lug 18 and extends through the bracket in which it is threaded. This bolt is locked in position preferably by a cotter pin 21 which extends through a slot or hole in the end of the bolt, as shown in Fig. 3. As the bolt is not threaded in the lug 18 it does not interfere with movement of the brake band into operative position, as in that case the lug 18 may slide longitudinally of the bolt, as is clearly shown in the lower portion of Fig. 1. The two free end portions of the brake band are similarly equipped with the releasing spring described, and the releasing devices of both portions are indicated by the same reference numerals.

22 indicates a spring mounted on the lever 7 around the pivot 13, one end of which spring engages the lever and the other end of which engages the bolt 10 in such manner that the spring tends to rotate the bolt 10 in a counter-clockwise direction, as viewed in Fig. 1. As the brake setting movement of the lever 7 operates to swing the bolt 10 in the opposite direction, and, therefore, puts the spring 22 under greater tension, it will be understood that said spring acts to hold the lever 7 in its normal position and helps to restore it and the brake band to its inoperative position when the brake lever is released.

The compression spring construction illustrated and described posses a number of advantages over the tension spring construction heretofore largely used, as the latter tends to crystalize very easily in service owing to the constant vibration, and it is also almost impossible to remove it, without distorting it and thereby rendering it practically useless, as is necessary when the brake band is removed for relining or other purposes. As such tension springs are usually attached by hooking them to the brake band and to fixed supports, considerable wear takes place owing to the slight movement of the parts when the brakes are applied, so that the springs wear out in a comparatively short time. My improved construction employing a spring of the compression type allows for large wearing surfaces at the ends of the spring, and eliminates danger of breakage; besides it may very easily be removed and replaced without damaging the spring.

What I claim as my invention and desire to secure by Letters Patent, is—

1. In a vehicle brake, the combination with a brake drum, a brake band cooperating therewith, and a brake operating lever, of a rigid abutment supported independently of the brake band and of said lever, a stop carried by the brake band adjacent to said abutment, a spring interposed between said abutment and stop and tending to move the brake band endwise, and a bolt movably connecting said abutment and stop.

2. In a vehicle brake, the combination with a brake drum and a brake band cooperating therewith, of a rigid abutment supported independently of the brake band, a stop carried by the brake band adjacent to said abutment, a spring interposed between said abutment and stop and tending to move the brake band endwise, and a bolt extending through said spring and adjustably connecting said abutment and stop.

3. In a vehicle brake, the combination with a brake drum, a brake band cooperating therewith, and a brake-operating lever, of a rigid abutment supported independently of the brake band and of said lever and positioned at a distance from and across the face of said brake band, a stop carried by the brake band adjacent to said abutment, a spring interposed between said abutment and stop and tending to move the brake band endwise, and a bolt movably connecting said abutment and stop.

4. In a vehicle brake, the combination with a brake drum, a brake band cooperating therewith, and a brake-operating lever, of a rigid abutment supported independently of the brake band and of said lever and positioned at a distance from and across the face of said brake band, and provided at its side margins with inwardly-turned flanges which lie opposite the edges of the brake band, a stop carried by the brake band adjacent to said abutment, a spring interposed between said abutment and stop and tending to move the brake band endwise, and a bolt movably connecting said abutment and stop.

5. In a vehicle brake, the combination with a brake drum, a brake band cooperating therewith, an operating lever pivotally connected with a free end portion of said brake band, and means connecting said lever intermediately with the other free end portion of the brake band, whereby by operating said lever said brake band may be moved into frictional engagement with the brake drum, of compression springs arranged normally to hold said brake band out of operative position and to be compressed by the movement of said brake band into braking engagement with the brake drum and bolts for adjusting the normal position of said brake band.

6. In a vehicle brake, the combination with a brake drum, a brake band cooperating therewith, an operating lever pivotally connected with a free end portion of said brake band, means connecting said lever intermediately with the other free end portion of the brake band, whereby by operating said lever said brake band may be moved into frictional engagement with the brake drum, rigid abutment supported independently of the brake bands, and of said operating lever, stops carried by said brake band adjacent to said abutments respectively, and springs interposed between said abutments and stops and adapted to be compressed by the movement of the brake band into operative engagement with the brake drum.

7. In a vehicle brake the combination with a brake drum, a brake band cooperating therewith, an operating lever pivotally connected with a free end portion of said brake band, means connecting said lever intermediately with the other free end portion of the brake band, whereby by operating said lever said brake band may be moved into frictional engagement with the brake drum, abutments supported independently of the brake band and of said operating lever, stops carried by said brake band adjacent to said abutments respectively, compression springs interposed between said abutments and stops, and bolts extending loosely through said stops and springs and having screw-threaded engagement with said abutments, for adjusting the normal position of said brake band.

8. In a vehicle brake the combination with a brake drum and a brake band cooperating therewith, of an operating lever pivotally connected with a free end portion of said brake band, a bolt pivotally connected with the intermediate portion of said lever and with the other free end portion of the brake band, and a spring mounted on the pivot of and bearing against said bolt so as to yieldingly hold said lever in its normal position.

EDMUND C. MOGFORD.